(12) United States Patent
Kim et al.

(10) Patent No.: US 11,556,873 B2
(45) Date of Patent: Jan. 17, 2023

(54) COGNITIVE AUTOMATION BASED COMPLIANCE MANAGEMENT SYSTEM

(71) Applicant: Bank of America Corporation, Charlotte, NC (US)

(72) Inventors: Jinna Kim, Charlotte, NC (US); Richard S. Scot, Huntersville, NC (US); Elena Kvochko, New York, NY (US); Monika Kapur, Jacksonville, FL (US); Michael Ogrinz, Easton, CT (US); George Albero, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 75 days.

(21) Appl. No.: 16/837,204

(22) Filed: Apr. 1, 2020

(65) Prior Publication Data
US 2021/0312360 A1 Oct. 7, 2021

(51) Int. Cl.
*G06Q 50/18* (2012.01)
*G06Q 10/06* (2012.01)
*G06Q 30/00* (2012.01)

(52) U.S. Cl.
CPC ..... *G06Q 10/06313* (2013.01); *G06Q 30/018* (2013.01); *G06Q 50/18* (2013.01)

(58) Field of Classification Search
None
See application file for complete search history.

(56) References Cited

U.S. PATENT DOCUMENTS

| | | | | |
|---|---|---|---|---|
| 7,937,319 | B2* | 5/2011 | Kennis | G06Q 30/018 |
| | | | | 705/37 |
| 9,123,024 | B2* | 9/2015 | LeVine | G06Q 10/0635 |
| 9,965,735 | B2* | 5/2018 | Ramesh Babu | G06Q 30/00 |
| 10,872,206 | B2* | 12/2020 | Snyder | G06N 20/00 |
| 11,087,219 | B1* | 8/2021 | Brecque | G06F 40/284 |
| 2002/0007302 | A1* | 1/2002 | Work | G06Q 10/06 |
| | | | | 705/317 |
| 2004/0107124 | A1* | 6/2004 | Sharpe | G06Q 10/06375 |
| | | | | 705/7.37 |
| 2005/0182736 | A1* | 8/2005 | Castellanos | G06F 40/211 |
| | | | | 705/80 |
| 2008/0228675 | A1* | 9/2008 | Duffy | G06F 40/295 |
| | | | | 707/999.005 |
| 2014/0288997 | A1* | 9/2014 | Schultz | G06Q 10/0635 |
| | | | | 705/7.28 |

(Continued)

*Primary Examiner* — Jamie H Austin
(74) *Attorney, Agent, or Firm* — Banner & Witcoff, Ltd.

(57) ABSTRACT

Aspects of the disclosure relate to a cognitive automation based compliance management system. A computing platform may receive, via a network, an alert notification indicative of a change to a legal framework applicable to an enterprise organization. Subsequently, the computing platform may, in response to the alert notification, detect a task that may be impacted by the change. Then, the computing platform may, upon detecting the task, identify at least one task parameter associated with the task. Then, the computing platform may compare the at least one task parameter with the change to determine whether the task is impacted by the change. Subsequently, the computing platform may, upon a determination that the task is impacted by the change, recommend, via the network, one or more actions associated with the task.

17 Claims, 4 Drawing Sheets

(56) References Cited

U.S. PATENT DOCUMENTS

| | | | |
|---|---|---|---|
| 2016/0140210 A1* | 5/2016 | Pendyala | G06F 40/205 |
| | | | 707/737 |
| 2016/0350766 A1* | 12/2016 | Clark | G06Q 50/18 |
| 2016/0371618 A1* | 12/2016 | Leidner | G06Q 10/0635 |
| 2017/0236129 A1* | 8/2017 | Kholkar | G06F 40/30 |
| | | | 705/317 |
| 2018/0053128 A1* | 2/2018 | Costas | G06Q 50/18 |
| 2018/0075554 A1* | 3/2018 | Clark | G06F 40/47 |
| 2018/0137107 A1* | 5/2018 | Buccapatnam Tirumala | |
| | | | G06N 20/00 |
| 2018/0268506 A1* | 9/2018 | Wodetzki | G06V 30/1985 |
| 2018/0315141 A1* | 11/2018 | Hunn | G06F 9/547 |
| 2019/0065593 A1* | 2/2019 | Barski | G06F 16/23 |
| 2019/0244149 A1* | 8/2019 | Krishnaswamy | G06Q 10/0637 |
| 2019/0266196 A1* | 8/2019 | Boyce | G06Q 50/188 |
| 2019/0354544 A1* | 11/2019 | Hertz | G06N 5/00 |
| 2020/0050620 A1* | 2/2020 | Clark | G06F 16/24578 |
| 2020/0090059 A1* | 3/2020 | Kim | G06F 40/205 |
| 2020/0219111 A1* | 7/2020 | Nair | G06F 40/205 |
| 2020/0257783 A1* | 8/2020 | Brannon | G06F 21/316 |
| 2020/0380624 A1* | 12/2020 | Turgman | G06Q 20/02 |
| 2021/0073915 A1* | 3/2021 | Crabtree | G06N 20/00 |

\* cited by examiner

COGNITIVE AUTOMATION BASED COMPLIANCE MANAGEMENT SYSTEM

BACKGROUND

Aspects of the disclosure relate to deploying digital data processing systems to manage network resources. In particular, one or more aspects of the disclosure relate to a cognitive automation based compliance management system.

Enterprise organizations may be governed by a variety of laws and/or regulations. In some instances, the laws and/or regulations may differ by jurisdiction. For large enterprise organizations, maintaining, updating, and managing compliance of various enterprise resources with changing laws and/or regulations may be of significant importance in maintaining an efficient and updated computing infrastructure. It may be helpful to automatically detect changes, and bring the enterprise resources into compliance with the changes. Ensuring that monitoring of laws and/or regulations is conducted in real-time, and that compliance with changes in such laws and/or regulations is performed in a timely manner, in real-time with speed and accuracy, may be particularly advantageous to ensure a smooth running of an enterprise infrastructure. In many instances, however, it may be difficult to detect changes in laws and/or regulations, identify an impact on enterprise resources, and maintain compliance of the impacted enterprise resources, in an organization's complex network comprising a vast number of network devices, services, vendors, and users, while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with compliance processes.

In accordance with one or more embodiments, a computing platform having at least one processor, and memory may receive, via a network, an alert notification indicative of a change to a legal framework applicable to an enterprise organization. Subsequently, the computing platform may, in response to the alert notification, detect, via the network, a task that may be impacted by the change. Then, the computing platform may, upon detecting the task, identify, via the network, at least one task parameter associated with the task. Then, the computing platform may compare the at least one task parameter with the change to determine whether the task is impacted by the change. Subsequently, the computing platform may, upon a determination that the task is impacted by the change, recommend, via the network, one or more actions associated with the task.

In some embodiments, the computing platform may compare the at least one task parameter with the change by analyzing, based on natural language processing, content associated with the legal framework.

In some embodiments, the computing platform may monitor, based on the change to the legal framework, a potential change to another legal framework applicable to an enterprise organization.

In some embodiments, the computing platform may generate another alert notification indicating the potential change.

In some embodiments, the computing platform may train a machine learning model to determine whether the task is impacted by the change. In some embodiments, the computing platform may apply the machine learning model to determine whether the task is impacted by the change.

In some embodiments, the computing platform may train a machine learning model to recommend the one or more actions associated with the task. In some embodiments, the computing platform may apply the machine learning model to recommend the one or more actions associated with the task.

In some embodiments, the task may include a review of a contract, and the computing platform may identify the at least one task parameter by conducting an image analysis of the contract. Then, the computing platform may determine, based on the image analysis, at least one term of the contract that may be impacted by the change. Subsequently, the computing platform may recommend the one or more actions by recommending the at least one term of the contract for review. In some embodiments, the computing platform may recommend the at least one term of the contract for review by modifying the at least one term of the contract to comply with the change to the legal framework.

In some embodiments, the task may include a review of an enterprise policy, and the computing platform may identify the at least one task parameter by determining at least one aspect of the enterprise policy that may be impacted by the change. Subsequently, the computing platform may recommend the one or more actions by recommending the at least one aspect of the enterprise policy for review.

In some embodiments, the computing platform may configure a web search engine to monitor a world wide web. Then, the computing platform may detect, based on the monitoring, the change to the legal framework. Subsequently, the computing platform may generate the alert notification indicating the change.

In some embodiments, the computing platform may configure the web search engine to monitor the world wide web by retrieving, from a website associated with a news medium, media content associated with the legal framework. Then, the computing platform may convert the media content to a textual format. In some embodiments, the computing platform may detect the change by analyzing the textual format.

In some embodiments, the computing platform may configure the web search engine to monitor the world wide web by retrieving, from a website associated with a regulatory entity, a text of the legal framework. Then, the computing platform may detect the change by analyzing, via optical character recognition, the text, to detect the change.

In some embodiments, the task may include a review of one or more of: a vendor policy, a process, a database policy, an encryption policy, and a data transmission policy.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to a cognitive automation based compliance management system. For example, an enterprise organization may be subject to a variety of laws and/or regulations that may impact a manner in which the enterprise organization is able to operate. For example, financial institutions, service providers, and/or insurance providers may operate within a regulatory framework applicable to the industry. Also, for example, as such organizations may store and/or process large amounts of personal data, they may also be required to store and/or process such data in specific ways so as to eliminate and/or minimize a risk of loss of data. Accordingly, such organizations may be subject to privacy and data protection laws, and such laws may be different in different jurisdictions.

Enterprise computing infrastructures may deploy computing resources such as software products to perform various tasks of an enterprise organization. In some instances, the software products may be provided by vendors. In some instances, the software products may be purchased under a contract with the vendor, and terms of such contracts may need to be updated to be compliant with changing laws and regulations that may govern the operation of the enterprise organization. For large enterprise organizations with vast amounts of deployed resources, a large number of employees, and a large client-base, compliance requirements of the software products may take varied and complex forms, and it may be advantageous to provide a real-time system to monitor laws and regulations to keep such products in compliance.

Generally, it may not be possible to manually monitor a variety of national, international, local legal frameworks, identify appropriate enterprise resources that may be affected by changes to such frameworks, and make timely recommendations. Accordingly, it may be of great significance for a large enterprise organization (e.g., financial institution), with large amounts of computing resources, to monitor legal frameworks, and automatically maintain compliance.

Accordingly, aspects of this disclosure relate to a cognitive automation based compliance management system. Monitoring legal frameworks via a manual process and/or based on mental steps is unlikely because it may relate to vast amounts of real-time online content that may be changing. Also, for example, there may be a large number of enterprise resources that may be located in different geographical areas and subject to different jurisdictional criteria. Also, for example, for a large enterprise organization, such resources may be rapidly changing in real-time over thousands of enterprise users and/or products, potentially spread over different geographical regions. Also, since enterprise resources may reside and/or be exchanged over a vast array of users, internal and external applications, and network devices, it necessitates a use of computing devices to perform the monitoring. Similarly, monitoring and/or analyzing large amounts of web content via a manual process and/or based on mental steps is unlikely because of inherent characteristics of the internet.

It may be further noted, that as processing and/or storing of personal data increasingly occurs over a computing network, the problem of complying with changes in laws and regulations, and timely application of such changes arises in the realm of networks, and as described herein, a solution is necessarily rooted in computer technology to overcome a problem arising in the realm of computer networks.

Figure 1A:
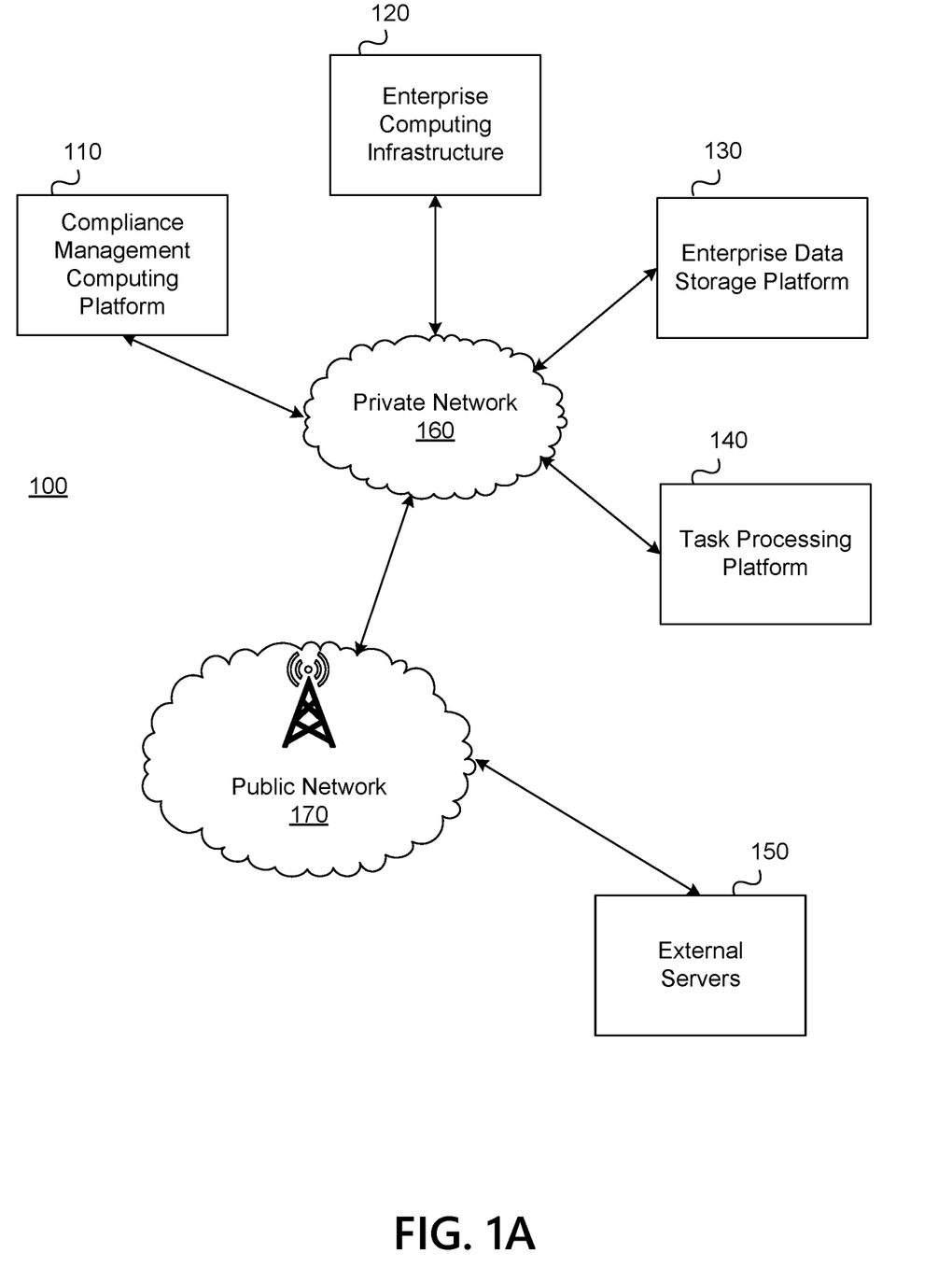
FIGS. 1A and 1B depict an illustrative computing environment for a cognitive automation based compliance management system in accordance with one or more example embodiments.
Figure 1B:
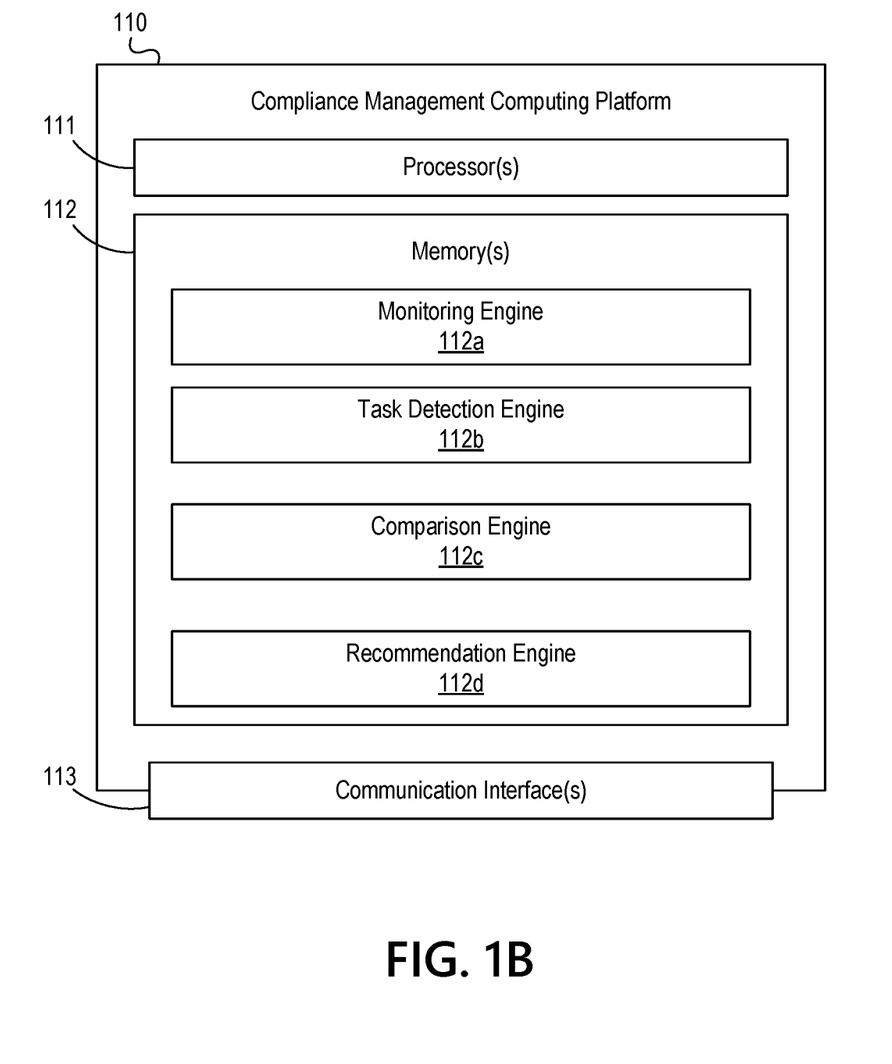

FIGS. 1A and 1B depict an illustrative computing environment for a cognitive automation based compliance management system in accordance with one or more example embodiments. Referring to FIG. 1A, computing environment 100 may include one or more computer systems. For example, computing environment 100 may include compliance management computing platform 110, enterprise computing infrastructure 120, enterprise data storage platform 130, task processing platform 140, and external servers 150.

As illustrated in greater detail below, compliance management computing platform 110 may include one or more computing devices configured to perform one or more of the functions described herein. For example, compliance management computing platform 110 may include one or more computers (e.g., laptop computers, desktop computers, servers, server blades, or the like) and/or other computer components (e.g., processors, memories, communication networks). In some embodiments, compliance management computing platform 110 may include a web search engine configured to crawl a world wide web to retrieve information and/or content relevant to the enterprise organization. For example, the web search engine may be configured to crawl the world wide web to retrieve information and/or content related to laws and/or regulations governing data privacy.

Enterprise computing infrastructure 120 may include one or more computing devices and/or other computer components (e.g., processors, memories, communication interfaces). In addition, enterprise computing infrastructure 120 may be configured to manage, host, execute, and/or otherwise provide one or more enterprise applications and/or devices (e.g., task processing platform 140). For example, enterprise computing infrastructure 120 may be configured to manage, host, execute, and/or otherwise provide a computing platform for various network devices, software products, communication channels, databases, servers, business workflow processes, vendor management systems, and so forth. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain information, such as information related to licensed products, transaction history, vendor information, contracts, enterprise policies, human resource policies, data protection, transmission, and retention policies, applicable laws and/or regulations, and/or other information. Also, for example, enterprise computing infrastructure 120 may include various servers and/or databases that may manage information technology resources for the enterprise organization. Additionally, or alternatively, enterprise computing infrastructure 120 may receive instructions from compliance management computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data, including data exchanged between network devices and/or other resources hosted, executed, and/or otherwise provided by enterprise computing infrastructure 120. Also, for example, enterprise data storage platform 130 may be configured to store and/or otherwise maintain information associated with enterprise policies, tasks, applicable laws and/or regulations, and so forth. Additionally, or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Task processing platform 140 may include one or more computers (e.g., laptop computers, desktop computers, servers, server blades, or the like) and/or other computer components (e.g., processors, memories, communication networks) to generate, modify, update, schedule, and/or perform other task related processing for tasks performed by the enterprise organization, and managed, hosted, executed, and/or otherwise provided by enterprise computing infrastructure 120. For example, task processing platform 140 may manage tasks associated with a contract review process, a vendor management process, an enterprise policy review process, and so forth. In some embodiments, task processing platform 140 may manage computer scripts associated with tasks.

External servers 150 may include a device, server, website, and so forth configured to provide information related to laws and/or regulations applicable to the enterprise organization. For example, external servers 150 may host a website that provides news content. As another example, external servers 150 may host a website for a government agency that provides laws and regulations. For example, external servers 150 may host a website for a government agency that provides information and/or content related to laws and/or regulations governing data privacy.

Computing environment 100 may include one or more networks, which may interconnect one or more of compliance management computing platform 110, enterprise computing infrastructure 120, enterprise data storage platform 130, task processing platform 140, and external servers 150. For example, computing environment 100 may include private network 160 (which may interconnect, for example, compliance management computing platform 110, enterprise computing infrastructure 120, enterprise data storage platform 130, task processing platform 140, and/or one or more other systems (which may be associated with an organization, such as a financial institution), and public network 170 (which may interconnect, for example, external servers 150 with private network 160 and/or one or more other systems, public networks, sub-networks, and/or the like). For example, public network 170 may interconnect external servers 150 with compliance management computing platform 110 via private network 160. In some instances, public network 170 may be a high generation cellular network, such as, for example, a fifth generation ("5G") or higher cellular network. In some instances, private network 160 may likewise be a high generation cellular enterprise network, such as, for example, a 5G or higher cellular network.

In one or more arrangements, compliance management computing platform 110, enterprise computing infrastructure 120, enterprise data storage platform 130, task processing platform 140, and external servers 150, and/or the other systems included in computing environment 100 may be any type of computing device capable of communicating with a user interface, receiving input via the user interface, and communicating with one or more other computing devices. For example, compliance management computing platform 110, enterprise computing infrastructure 120, enterprise data storage platform 130, task processing platform 140, external servers 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of compliance management computing platform 110, enterprise computing infrastructure 120, enterprise data storage platform 130, task processing platform 140, and external servers 150, may, in some instances, be special-purpose computing devices configured to perform specific functions.

Referring to FIG. 1B, compliance management computing platform 110 may include one or more processors 111, memory 112, and communication interface 113. A data bus may interconnect processor 111, memory 112, and communication interface 113. Communication interface 113 may be a network interface configured to support communication between compliance management computing platform 110 and one or more networks (e.g., public network, private network, a local network, or the like). Memory 112 may include one or more program modules having instructions that when executed by processor 111 cause compliance management computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of compliance management computing platform 110 and/or by different computing devices that may form and/or otherwise make up compliance management computing platform 110. For example, memory 112 may have, store, and/or include monitoring engine 112a, task detection engine 112b, comparison engine 112c, and recommendation engine 112d.

Monitoring engine 112a may have instructions that direct and/or cause compliance management computing platform 110 to detect, via a network, a change to a legal framework applicable to an enterprise organization. In some embodiments, monitoring engine 112a may have instructions that direct and/or cause compliance management computing platform 110 to receive, via a network, an alert notification indicating the change to the legal framework.

Task detection engine 112b may have instructions that direct and/or cause compliance management computing platform 110 to detect, via the network, a task that may be impacted by the change. In some embodiments, task detection engine 112b may have instructions that direct and/or cause compliance management computing platform 110 to, upon detecting the task, identify, via the network, at least one task parameter associated with the task.

Comparison engine 112c may have instructions that direct and/or cause compliance management computing platform 110 to compare the at least one task parameter with the change to determine whether the task is impacted by the change.

Recommendation engine 112d may have instructions that direct and/or cause compliance management computing platform 110 to recommend, via the network, one or more actions associated with the task.

Figure 2:
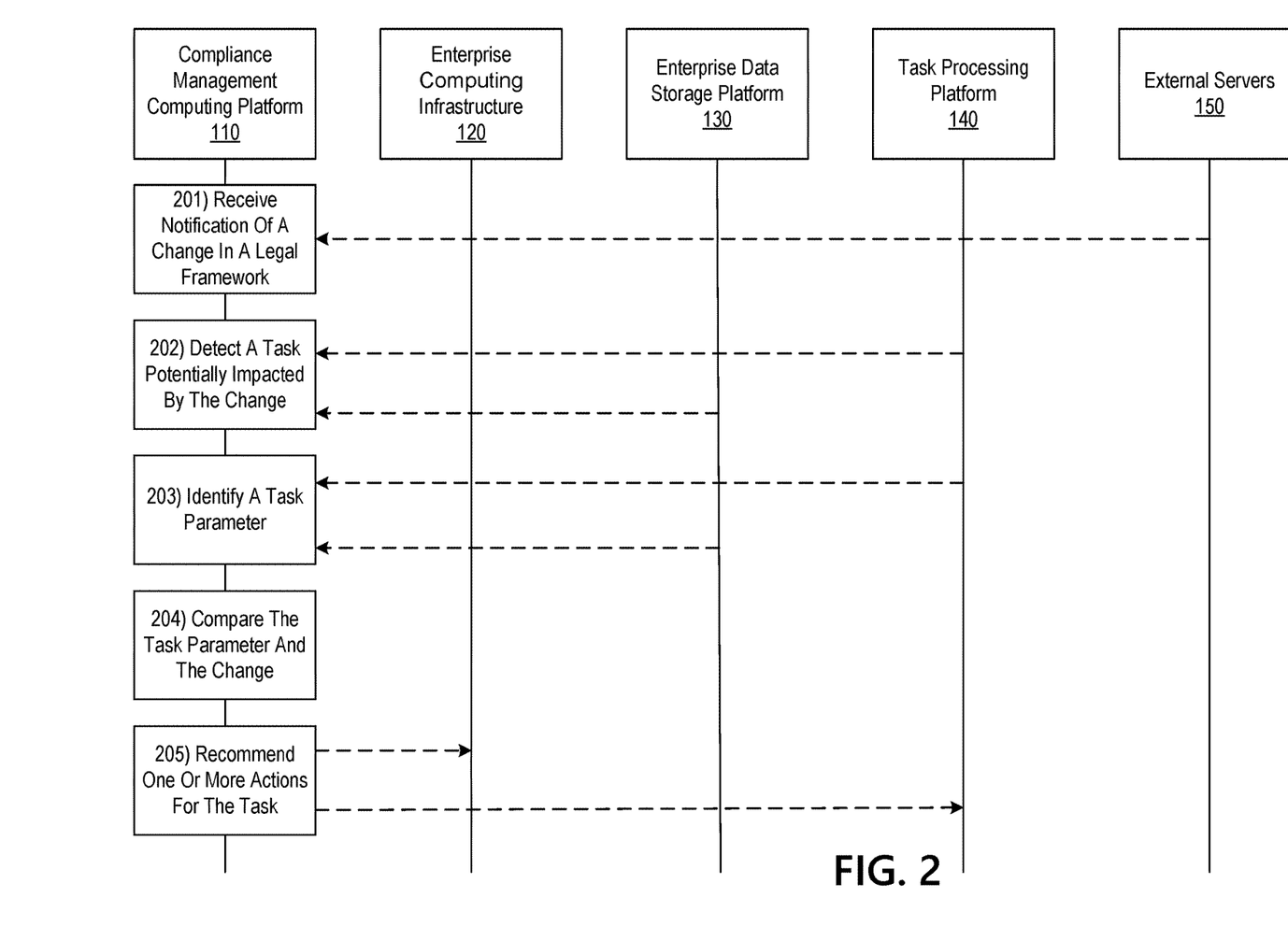
FIG. 2 depicts an illustrative event sequence for a cognitive automation based compliance management system in accordance with one or more example embodiments.

FIG. 2 depicts an illustrative event sequence for a cognitive automation based compliance management system in accordance with one or more example embodiments. Referring to FIG. 2, at step 201, compliance management computing platform 110 may receive, via a network, an alert notification indicative of a change to a legal framework applicable to an enterprise organization. The term "legal framework" as used herein may generally refer to laws and/or regulations that may apply to an organization. Some organizations, such as financial institutions, insurance providers, and so forth may operate in a regulatory framework. Also, for example, organizations that store, process, or otherwise manage personal data (e.g., personal identifying information (PII), personal credit information (PCI), and so forth) may be governed by data protection and/or privacy laws. The legal framework may also include, court decisions, and so forth.

Example laws and regulations may include, for example, General Data Protection Regulation (EU) 2016/679 (GDPR), Telephone Consumer Protection Act of 1991 (TCPA), California Consumer Privacy Act (CCPA), ePrivacy Regulation (ePR). In some embodiments, laws and regulations may include National Advertising Initiative guidelines related to Interest-Based Advertising (IBA), Cross-App Advertising (CAA), and Retargeting (collectively, Tailored Advertising) as well as Ad Delivery and Reporting (ADR).

Financial institutions (e.g., banks) are generally regulated by the Federal Deposit Insurance Corporation (FDIC), the Federal Reserve Board (FRB), or the Office of the Comptroller of the Currency (OCC). Additional applicable legal frameworks may include, for example, Regulation P that governs a use of a customer's private data, anti-money laundering and anti-terrorism laws, regulations that govern deposit accounts, consumer protection laws, debt collection laws, laws governing unfair or deceptive acts or practices, and so forth. External servers 150 may provide information and data related to such laws and regulations. For example, external servers 150 may host websites for regulatory entities such as FDIC, FRB, OCC, and so forth.

Generally, a change in the legal framework may be a change in one or more laws and/or regulations that may apply to operations of the enterprise organization. In some instances, a change in the legal framework may include a potential and/or anticipated change in the legal framework. For example, a bill may be introduced in a state, local, and/or national legislature. Also, for example, a regulatory agency may issue a notice for public comments. As another example, there may be an anticipated court decision.

As described herein, compliance management computing platform 110 may receive an alert notification indicating such changes to a legal framework. For example, the Federal Reserve Board may cut interest rates, and compliance management computing platform 110 may receive an alert notification indicating that the Federal Reserve Board has cut the interest rates. As another example, there may be a change to Regulation P, and compliance management computing platform 110 may receive an alert notification indicating that there has been a change to Regulation P. Also, for example, a bill related to debt collection laws may be introduced in Congress, and compliance management computing platform 110 may receive an alert notification indicating that the bill has been introduced.

In some embodiments, compliance management computing platform 110 may monitor, based on the change to the legal framework, a potential change to another legal framework applicable to an enterprise organization. For example, one state may pass a law (e.g., California's laws on data protection), and another state (e.g., New York, Florida, Washington, and so forth) may consider similar laws. Accordingly, based on the law passed in California, compliance management computing platform 110 may monitor potential changes to laws in other states, such as, for example, New York, Florida, Washington, and so forth. Also, for example, EU may change a regulation, and member states may consider implementing appropriate changes. Accordingly, based on the change in the EU regulation, compliance management computing platform 110 may monitor potential changes to laws and/or regulations in member EU states.

In some embodiments, compliance management computing platform 110 may generate another alert notification indicating the potential change. For example, compliance management computing platform 110 may detect activity related to a potential change to data privacy laws in Washington, and may generate another alert notification indicating the potential change.

In some embodiments, compliance management computing platform 110 may configure a web search engine to monitor a world wide web. For example, the web search engine may utilize an automated script such as a web crawler (e.g., a spider, a bot, a robot, and so forth) to search the internet and index sites on the internet. For example, compliance management computing platform 110 may configure the web search engine to automatically monitor the world wide web at regular intervals. In some aspects, compliance management computing platform 110 may configure the web search engine to monitor external servers 150.

In some embodiments, compliance management computing platform 110 may detect, based on the monitoring, the change to the legal framework. In some embodiments, compliance management computing platform 110 may, based on the indexing, identify one or more sites that may provide content relevant to the operations of the enterprise organization. Accordingly, compliance management computing platform 110 may configure the web search engine to monitor the one or more sites. In some embodiments, compliance management computing platform 110 may configure the web search engine to retrieve content from the one or more sites. Such retrieved content may be compared to prior content, and compliance management computing platform 110 may detect a change in the content. In some embodiments, text processing techniques may be utilized to analyze the change in the content. In some instances, compliance management computing platform 110 may determine that the change in the content is indicative of a change to a legal framework. For example, compliance management computing platform 110 may, based on a comparison of the retrieved content to the prior content, determine a change in a language in a law and/or a regulation. In some embodiments, compliance management computing platform 110 may generate the alert notification indicating the change.

Accordingly, compliance management computing platform 110 may generate the alert notification indicating such a change.

In some embodiments, compliance management computing platform 110 may retrieve, from a website associated with a news medium, media content associated with the legal framework. For example, compliance management computing platform 110 may crawl a website associated with a news medium, retrieve content from the website, and based on text processing techniques, determine that the content is indicative of a change in a law and/or a regulation.

In some embodiments, compliance management computing platform 110 may convert the media content to a textual format. In some examples, the media content may be formatted as an audio, a video, a photograph, and so forth. Accordingly, compliance management computing platform 110 may generate a transcription of the audio, the video, and so forth. In some embodiments, compliance management computing platform 110 may convert the photo to a textual format (e.g., binary format).

In some embodiments, compliance management computing platform 110 may analyze the textual format to detect the change. For example, compliance management computing platform 110 may retrieve a news article, perform a textual analysis of the content of the article, and determine that the content is indicative of a change in a law and/or a regulation. Also, for example, for media content that is not in textual format, compliance management computing platform 110 may retrieve the media content, convert the content to textual format, perform an analysis of the textual format, and determine that the content is indicative of a change in a law and/or a regulation.

Regulatory entities generally host websites that include information related to compliance by organizations that are under the purview of the regulatory entity. For example, the Federal Reserve hosts and/or maintains a website that includes information about "News and Events" that includes "Press Releases". Also, for example, the website includes information on regulations such as, "Institution Supervision," "Reports," "Reporting Forms," "Regulatory Resources," "Banking and Data Structure," and so forth. Under a tab for "Reporting Forms," a drop down menu provides a plurality of forms that may be used by financial institutions. Also, for example, under the tab for "Regulatory Resources," is a tab for "Regulations" that lists amendments and/or proposed amendments to the regulations. In some embodiments, compliance management computing platform 110 may configure the web search engine to monitor these and other sites to detect if any changes have been proposed and/or implemented.

Although examples herein describe the process with reference to some aspects of the Federal Reserve, it may be understood that similar processes may apply to other information and resources available at the Federal Reserve website. Similarly, similar processes may apply to other information and resources available, now or in the future, at any website of relevance to the enterprise organization.

In some embodiments, compliance management computing platform 110 may retrieve, from a website associated with a regulatory entity (e.g., from external servers 150), a text of the legal framework. For example, compliance management computing platform 110 may, based on the web search engine, retrieve, from a web portal for the Federal Reserve, content related to Equal Credit Opportunity. For example, a link to "Recent Amendments" may indicate that an amendment has been added. Accordingly, compliance management computing platform 110 may retrieve the text of the amendment.

As another example, compliance management computing platform 110 may, based on the web search engine, retrieve, from a web portal for the Federal Reserve, updates to "Reporting Forms" from a link to a web portal for "Recent Reporting Form Updates." For example, compliance management computing platform 110 may determine that a particular reporting form has been updated, and may retrieve the updated form.

In some embodiments, compliance management computing platform 110 may analyze, via optical character recognition, the text, to detect the change. For example, compliance management computing platform 110 may perform optical character recognition and detect a change in a web content for a regulatory entity. For example, compliance management computing platform 110 may determine, by performing optical character recognition on the content from the web portal for the Federal Reserve, that changes have been made to Equal Credit Opportunity. For example, performing optical character recognition on the content retrieved from "Recent Amendments" may indicate that changes were made in an amendment. As another example, compliance management computing platform 110 may determine, by performing optical character recognition on a form retrieved from "Recent Reporting Form Updates" that changes have been made to the form.

At step 202, compliance management computing platform 110 may, in response to the alert notification, detect, via the network, a task that may be impacted by the change. In some aspects, task processing platform 140 may manage, configure, control, and/or otherwise process various aspects of a task. The term "task" as used herein, may include a variety of compliance related tasks performed by the enterprise organization. For example, the task may relate to a reporting activity to a regulatory entity. For example, one or more standard forms and/or reporting formats may be used to report earnings to a regulatory entity like the Securities and Exchange Commission (SEC). Also, for example, customer data may be stored in a database, and the task may relate to aspects of how the data is stored, where the data is stored, how the data is transmitted to the database, whether (and how) the data is encrypted, a source of the data, and so forth.

Also, for example, the task may relate to one or more aspects of contractual relationships. For example, the enterprise organization may have contractual relationships with vendors that may provide software products. Such contractual relationships may be based on documents (e.g., commercial contracts) that may include terms affected by changes in the legal framework. Also, for example, the enterprise organization may have contractual relationships with customers, lenders, investors, employees, and so forth, and such relationships may be based on documents (e.g., contracts) that may include terms affected by changes in the legal framework.

As another example, Regulation D relates to reserve requirements for depository institutions. For example, Regulation D defines the institutions and the deposits that may be subject to reserve requirements, and sets forth how reserve requirements may be calculated. Regulation D also sets forth how institutions may satisfy such requirements, and identifies the obligations of institutions to file reports in connection with reserve requirements. Accordingly, the task may relate to identifying the relevant deposits, identifying and/or modifying the calculations for reserve requirements, identifying, completing, and/or filing the relevant reports, and so forth.

Generally, for a financial institution, such as a hank, the task may relate to any type of activity related to banking regulatory policies, security regulatory policies, and so forth. For example, banking regulatory policies may include capital adequacy, conduct of business rules, anti-trust policy, conflict of interest rules, deposit insurance, limits on interest on deposits and/or loans, liquidity requirements, reserve requirements, restrictions on geographic reach, restrictions on services and product lines, and so forth. Accordingly, compliance management computing platform 110 may identify the tasks related to compliance with the banking regulatory policies, and task processing platform 140 may process such tasks.

Also, for example, security regulatory policies may include disclosure standards, registration requirements, insider trading prohibition, takeover rules, protection of minority shareholders, investment management rules, and so forth. Accordingly, compliance management computing platform 110 may identify the tasks related to compliance with the security regulatory policies, and task processing platform 140 may process such tasks.

In some instances, a financial institution may also host a trading platform, a mortgage platform, and so forth, and compliance management computing platform 110 may identify the tasks related to compliance with policies that govern operations of these platforms. For example, compliance management computing platform 110 may identify the tasks related to compliance with providing non-traditional mortgage products, rules, and/or compliance with lending rules. In some instances, such rules may differ by jurisdiction (e.g., states, countries, and so forth).

At step 203, compliance management computing platform 110, upon detecting the task, identify, via the network, at least one task parameter associated with the task. Generally, the term "task parameter" as used herein, may refer to an aspect of the task, such as a sub-task, and/or one or more steps to perform the task. For example, the task may relate to deposits that may fall under a purview of Regulation D for reserve requirements, and the task parameter may correspond to identifying the relevant deposits, identifying the calculations for reserve requirements, modifying the calculations for reserve requirements, identifying the relevant reports, completing the relevant reports, and/or filing the relevant reports.

As another example, the task may relate to a vendor contract, and the task parameter may be to identify a relevant term in the contract, modify a term in the contract, propose a modification of a term in the contract, highlight a term for further manual review, and so forth. As another example, the task may relate to compliance with data privacy, and the task parameter may be to identify a source of incoming data, classifying the data, encrypting the data, and so forth.

At step 204, compliance management computing platform 110 may compare the at least one task parameter with the change to determine whether the task is impacted by the change. For example, the task parameter may relate to a identifying a source of incoming data, and compliance management computing platform 110 may compare the source locations to the change to determine whether the task is impacted by the change. For example, there may have been no previous requirement to encrypt data received from Country X. In some instances, compliance management computing platform 110 may analyze the change and determine that there continues to be no requirement to encrypt the data received from Country X. In some instances, compliance management computing platform 110 may analyze the change and determine that there is a new requirement to encrypt the data received from Country X.

As another example, the task parameter may relate to identifying the calculations for reserve requirements under Regulation D. Accordingly, compliance management computing platform 110 may compare the calculations in the change to existing calculations to determine whether the task is impacted by the change. Also, for example, the task parameter may relate to limits on interest on deposits and/or loans, and compliance management computing platform 110 may compare the existing limits to the changes, and determine whether the task is impacted by the change. As another example, the task parameter may relate to review of a term of a vendor contract, and compliance management computing platform 110 may compare the existing term in the contract to the changes, and determine whether the task is impacted by the change.

In some embodiments, compliance management computing platform 110 may train a machine learning model to determine whether the task is impacted by the change. For example, various tasks may be associated with keywords that may trigger various actions. In some embodiments, compliance management computing platform 110 may train the machine learning model to learn whether a task may be impacted by a change, based, for example, with the associated keywords. For example, the change may generally relate to data privacy, and the machine learning model may retrieve content indicative of the change. In some embodiments, compliance management computing platform 110 may extract keywords from the content, and search a repository for tasks associated with the keywords. In some embodiments, the machine learning model may be configured to learn to associate types of changes to types of tasks, and/or task parameters.

Also, for example, a change in an interest rate may impact many documents, financial instruments, contracts, policies, and so forth. The machine learning model may be configured to learn and generate logic that may identify such consequences. As another example, a change in a quantifiable parameter (e.g., mortgage rates, limits on interest on deposits and/or loans, and so forth) may impact other parameters. Accordingly, the machine learning model may be configured to learn interactions between quantifiable parameters, and determine if a change to one parameter impacts another.

Also, for example, privacy laws in California may typically be followed by changes in Washington and New York. Accordingly, the machine learning model may be configured to learn such a cause and effect relationship, and monitor websites related to laws and regulations in Washington and/or New York for potential changes, and/or predict potential changes in Washington and/or New York.

In some embodiments, compliance management computing platform 110 may apply the machine learning model to determine whether the task is impacted by the change. For example, the machine learning model may learn, from an analysis of a textual document, that particular tasks may be impacted. For example, several statutory damage provisions may apply to an industry. Accordingly, compliance management computing platform 110 may apply the machine learning model to determine if risk levels for an organization need to be reviewed and/or modified. Also, for example, compliance management computing platform 110 may apply the machine learning model to determine if budget allocations need to be modified based on a number of financial instruments that the organization may own. In some embodiments, compliance management computing platform 110 may apply statistical inference models to refine the machine learning models so as to extract changes to tasks and/or task parameters based on information that may be previously unknown to the machine learning model.

In some embodiments, compliance management computing platform 110 may analyze, based on natural language processing (NLP), content associated with the legal framework. For example, techniques such as contextual analysis, syntactic analysis, part-of-speech tagging, parsing, word segmentation, stemming, machine translation, relationship extraction, topic segmentation, word sense disambiguation, summarizations, speech recognition, and so forth may be utilized to analyze the content.

Generally, machine learning models to analyze content may be trained to recognize patterns. In some embodiments, compliance management computing platform 110 may train a machine learning model based on previously detected patterns. For example, compliance management computing platform 110 may train a machine learning model to recognize patterns that were previously detected. In some embodiments, additional detection rules may be input into compliance management computing platform 110.

In some examples, the training may be unsupervised. For example, the machine learning model may utilize an output of text processing of the textual data to learn to detect patterns indicative of rules, regulations, and/or tasks associated with rules and/or regulations. For example, identifying a pattern based on a context of the content may be a form of unsupervised learning. For example, cluster analysis may be utilized to group historical textual data, identify shared attributes, and create rules for pattern recognition based on such rules. One or more neural network models may be utilized to train the machine learning model.

Unsupervised learning may be utilized, for example, to detect unknown patterns, and/or unstructured data that was previously not analyzed by the machine learning model. For example, the machine learning model may analyze large volumes of textual data in web content. Based on such analysis, the machine learning model may detect hidden patterns in the information. Also, for example, as more data is retrieved from external servers 150, the machine learning model may continually learn to detect additional patterns. Many available techniques for unsupervised learning may be utilized, such as, for example, clustering, partitioning, agglomerative, clustering of data based on fuzzy sets, probabilistic clustering, and so forth. Also, for example, clustering techniques may include, for example, hierarchical clustering, K-means clustering, singular value decomposition, principal component analysis ("PCA"), and so forth.

In some embodiments, compliance management computing platform 110 may train a machine learning model based on supervised learning methods. For example, labeled data may be provided to the machine learning model. For example, one or more rules may be provided to the machine learning model. Also, for example, when compliance management computing platform 110 detects a pattern, this may be verified by a domain expert, and such labeled data may be provided to the machine learning model.

Given the large volumes of data and information that may be retrieved from external servers 150, and the large number of related tasks within enterprise computing infrastructure 120, much of the training data may not be labeled. Accordingly, compliance management computing platform 110 may also train the machine learning model based on semi-supervised learning methods. For example, patterns in some of the textual data may be identified by domain experts, and may be provided to the machine learning model as labeled data.

In some embodiments, compliance management computing platform 110 may, upon a determination that the task is impacted by the change, identify, via the network and for the task, a script associated with the at least one task parameter. Generally, tasks may be automatically performed by executing computer scripts. A scripting language may be utilized to implement control logics. For example, JavaScript may be utilized to generate commands for tasks related to webpages. As another example, Perl, Hypertext Pre-processor (PHP), and Python may be utilized as server-side scripting languages.

At step 205, compliance management computing platform 110 may, upon a determination that the task is impacted by the change, recommend, via the network, one or more actions associated with the task. For example, compliance management computing platform 110 may determine that a contract term is impacted by the change, and may recommend a replacement term. As another example, compliance management computing platform 110 may apply the machine learning model to set appropriate risk levels for an organization, and/or recommend budget allocations based on a number of financial instruments that the organization may own, and applying the limits to calculate risks. Also, for example, upon a change in the statutory limits and/or ranges, compliance management computing platform 110 may apply the machine learning model to update the risk models based on changes to underlying limits. As another example, compliance management computing platform 110 may analyze the change and determine that there is a new requirement to encrypt the data received from Country X, and may recommend encryption for the data, and/or encrypt the data.

In some embodiments, compliance management computing platform 110 may recommend, via the network, one or more actions associated with the script. For example, compliance management computing platform 110 may identify the changes to the task parameters, and automatically reconfigure the scripts to implement the changes to the task parameters.

In some embodiments, compliance management computing platform 110 may train a machine learning model to recommend the one or more actions associated with the task, and may apply the machine learning model to recommend the one or more actions associated with the task. For example, the machine learning model may be trained to generate notifications when changes to tasks, and/or task parameters are detected. For example, if data from a source is to be protected in transit, then the machine learning model may be trained to identify the source, detect data being received from the source, and automatically recommend the data to be encrypted before transmission is initiated. For example, the machine learning model may generate notifications to the security team to encrypt the data, and in some instances, recommend encryption techniques based on the type of data. As another example, when changes to statutory limits for damages are detected, the machine learning model may be trained to learn consequences of these changes, generate alert notifications, and send the alert notifications to a legal team that manages contract review.

In some embodiments, a supervised learning model may be utilized. For example, upon a change in interest rates, the machine learning model may be provided labeled data that indicates changes that may need to be made to other quantifiable parameters within the enterprise. Based on such labeled data, the machine learning model may be trained to detect a cut in the interest rate by the Federal Reserve, and determine appropriate changes to a prime rate. Also, for example, the machine learning model may apply a set of lending rules as parameters to determine a total amount of loans and credits applicable to each customer.

In some embodiments, the task may include a review of a contract, and compliance management computing platform 110 may conduct an image analysis of the contract. For example, compliance management computing platform 110 may retrieve, from a repository of contracts (e.g., enterprise data storage platform 130), one or more contracts associated with a software product. Subsequently, compliance management computing platform 110 may conduct an image analysis of the one or more contracts. For example, compliance management computing platform 110 may apply optical character recognition (OCR) to process the one or more contracts.

In some embodiments, compliance management computing platform 110 may determine, based on the image analysis, at least one term of the contract that may be impacted by the change. In some embodiments, compliance management computing platform 110 may retrieve, based on the image analysis and from a database of contract terms, one or more terms relevant to the contract that may have changed. For example, based on the image analysis, compliance management computing platform 110 may identify that the contract includes contractual clauses related to one or more of a limitation of liability, third-party infringement, open source, escrow, assignment, and so forth. Accordingly, compliance management computing platform 110 may retrieve, from the repository of contracts (e.g., enterprise data storage platform 130), one or more terms related to such contractual clauses that may have changed. For example, the machine learning model may generate updated clauses or model clauses for each contractual term, based on changes that have been detected. Such model clauses may, for example, be based on updated policies of the enterprise organization.

For example, an open source community may have changed terms in its open source requirements. Accordingly, compliance management computing platform 110 may detect such a change, and the machine learning model may generate a model clause with such changed terms, and save the model clause in the repository of contracts (e.g., enterprise data storage platform 130). In some embodiments, compliance management computing platform 110 may recommend the at least one term of the contract for review. For example, compliance management computing platform 110 may send an alert notification to a legal team to review the model clause. For example, compliance management computing platform 110 may prepare a summary document with the previous clause, provide a link to the website where a change was detected, and propose the model clause.

In some embodiments, compliance management computing platform 110 may modify the at least one term of the contract to comply with the change to the legal framework. For example, compliance management computing platform 110 may, upon identifying the at least one term of the contract for review, automatically generate a modified contract with updated terms (from the model clauses) inserted to replace the at least one term. For example, compliance management computing platform 110 may generate a new document by replacing an older version of the limitation of liability terms with the terms in a corresponding model clause for the limitation of liability. In some embodiments, compliance management computing platform 110 may generate an amendment to the contract with the at least one term replaced with an updated term (from a corresponding model clause).

In some embodiments, the task may include a review of an enterprise policy, and compliance management computing platform 110 may determine at least one aspect of the enterprise policy that may be impacted by the change. For example, an organization may be required to comply with provisions of the Equal Credit Opportunity Act (ECOA). Generally, this Act prohibits creditors from discriminating the creditworthiness of applicants with regard to their various demographic factors or classes. In some instances, compliance management computing platform 110 may determine that another protected class, for example class Y, may have been added to the list of factors or classes. Accordingly, compliance management computing platform 110 may determine aspects of the enterprise policies that are impacted by an addition of class Y.

As another example, an organization may be required to comply with provisions of Reg P—Privacy of Consumer Financial Information, which provides protections for the treatment of customers' personal information. The regulation generally requires notice to customers about a financial institution's privacy policy and practices, describes conditions in which the financial institution may share nonpublic information, and provides a method for a customer to "opt-out" of sharing information from some nonaffiliated third parties. In some instances, compliance management computing platform 110 may determine that in addition to an initial privacy notice, and an annual privacy notice, there is a new requirement to provide a semi-annual privacy notice. Accordingly, compliance management computing platform 110 may determine aspects of the enterprise policies that are impacted by an addition of the additional notice.

In some embodiments, compliance management computing platform 110 may recommend the at least one aspect of the enterprise policy for review. For example, compliance management computing platform 110 may determine aspects of the enterprise policies that are impacted by an addition of class Y as a protected class under the Equal Credit Opportunity Act. Accordingly, in some examples, compliance management computing platform 110 may identify documents (e.g., contracts, policy documents, enterprise guidelines, reports, and so forth), and modify such documents to comply with the new regulations. In some examples, compliance management computing platform 110 may identify management personnel associated with the at least one aspect of the enterprise policy, and provide the modified documents for review. In some examples, compliance management computing platform 110 may send alert notifications to the management personnel alerting them of changes to the regulation.

As another example, compliance management computing platform 110 may determine that there is a new requirement to provide a semi-annual privacy notice under the provisions of Reg P—Privacy of Consumer Financial Information. Accordingly, in some examples, compliance management computing platform 110 may identify existing privacy notices, modify such notices, identify recipients, and send the notices to the recipients. In some examples, compliance management computing platform 110 may identify management personnel associated with management of the privacy notices (e.g., content, recipients, and so forth), and provide the modified notices for review. In some examples, compliance management computing platform 110 may send alert notifications to the management personnel alerting them of changes to the notice requirements.

In some embodiments, the task may include a review of one or more of: a vendor policy, a process, a database policy, an encryption policy, and a data transmission policy. Although examples herein have been provided for data encryption, contract review, and enterprise policy review, compliance management computing platform 110 may configure similar automatic reviews, updates, notices, alerts, and so forth for other tasks of an enterprise organization. For example, an enterprise organization may engage external vendors to provide infrastructure support, software products, servers, cloud computing resources, X-as-a-Service tools (e.g., Software-as-a-Service (SaaS), Platform-as-a-Service (PaaS), Infrastructure-as-a-Service (IaaS), and so forth). Each such service, product, and so forth may be associated with vendor agreements, data protection policies, access controls, and so forth. Accordingly, compliance management computing platform 110 may configure similar automatic reviews, updates, notices, alerts, and so forth for tasks related to vendor policy review.

As another example, processes such as trading processes, insurance underwriting processes, money transfer processes, customer notification processes, processes for international currency transfers, and so forth, may be affected by changes to legal frameworks, and compliance management computing platform 110 may configure similar automatic reviews, updates, notices, alerts, and so forth for tasks related to such processes. In some aspects, such processes may be controlled by computer scripts, and compliance management computing platform 110 may configure and/or update the computer scripts.

Also, for example, enterprise organizations may store large amounts of data. Regulations may impact where such data may be stored, what type of data may be stored, how long data may be stored, what type of data may need to be anonymized, and so forth. Database policies may govern such tasks. Accordingly, compliance management computing platform 110 may configure similar automatic reviews, updates, notices, alerts, and so forth for tasks related to such data base policies, encryption policies, and/or data transmission policies.

Figure 3:
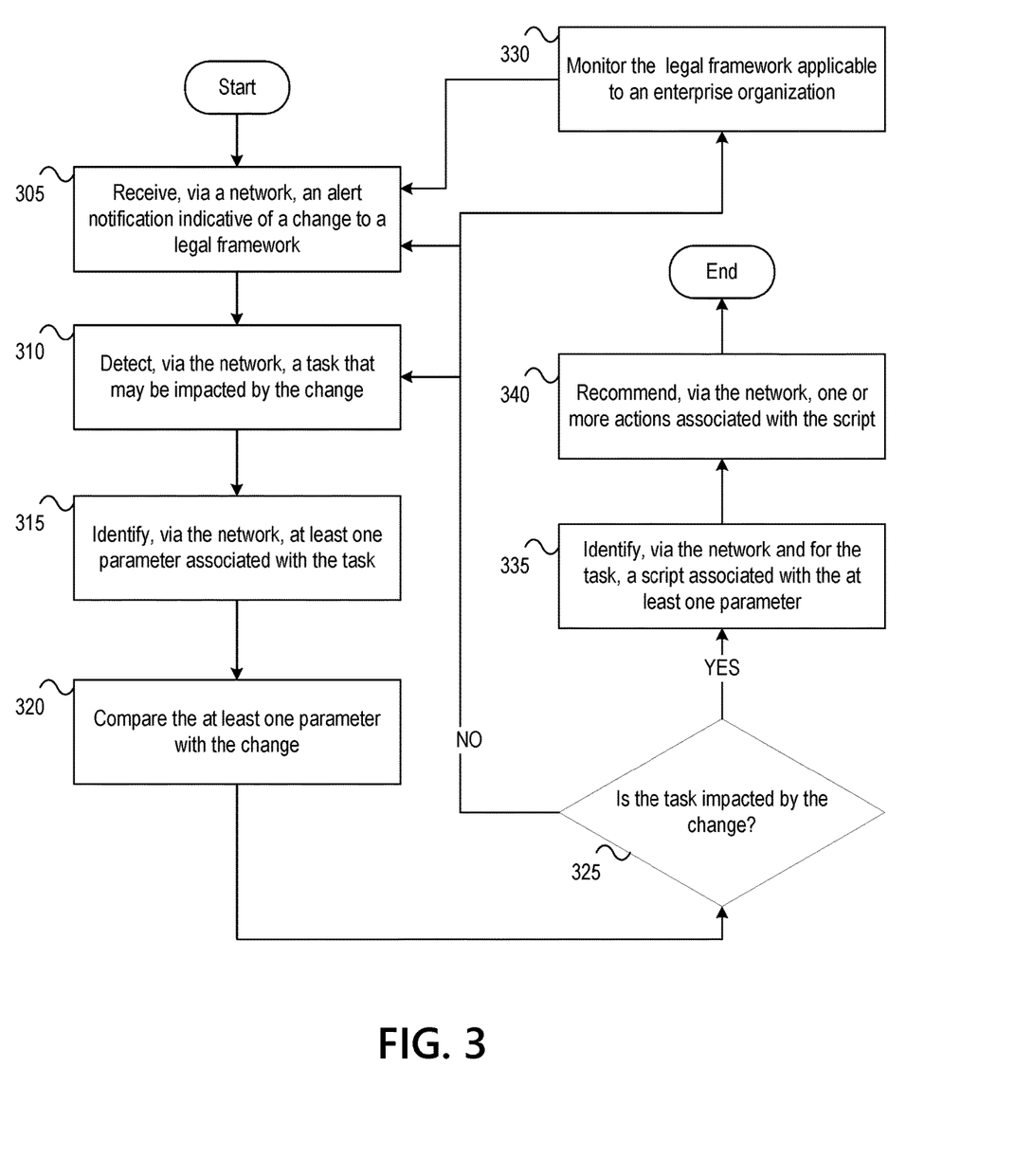
FIG. 3 depicts an illustrative method for a cognitive automation based compliance management system in accordance with one or more example embodiments.

FIG. 3 depicts an illustrative method for a cognitive automation based compliance management system in accordance with one or more example embodiments. Referring to FIG. 3, at step 305, a computing platform having at least one processor, and memory may receive, via a network, an alert notification indicative of a change to a legal framework applicable to an enterprise organization. At step 310, the computing platform may, in response to the alert notification, detect, via the network, a task that may be impacted by the change. At step 315, the computing platform may, upon detecting the task, identify, via the network, at least one task parameter associated with the task. At step 320, the computing platform may compare the at least one task parameter with the change.

At step 325, the computing platform may determine whether the task is impacted by the change. Upon a determination that the task is not impacted by the change, the process may return to step 305 to receive another alert notification. In some embodiments, upon a determination that the task is not impacted by the change, the process may return to step 310 to detect another task that may be impacted by the change. In some embodiments, upon a determination that the task is not impacted by the change, the process may proceed to step 330. At step 330, the computing platform may monitor the legal framework applicable to an enterprise organization. In some embodiments, the process may subsequently proceed to step 305.

Upon a determination that the task is impacted by the change, the process may move to step 335. At step 335, the computing platform may identify, via the network and for the task, a script associated with the at least one task parameter. At step 340, the computing platform may recommend, via the network, one or more actions associated with the script.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor; and
memory storing computer-readable instructions that, when executed by the at least one processor, cause the computing platform to:
configure a web search engine to execute an automated script including a web search crawler to search and index websites on an internet;
based on the indexing, identify one or more websites from which to retrieve data;
receive data from the identified one or more websites, the received data including video content;
convert the video content in the received data to a textual format;
analyze, using natural language processing, the converted video content to detect an indication of a change to a legal framework applicable to an enterprise organization;
in response to detecting the indication of the change to the legal framework, detect, via a network, a task that may be impacted by the change;
upon detecting the task, identify, via the network, at least one task parameter associated with the task;
compare the at least one task parameter with the change to determine whether the task is impacted by the change; and
upon a determination that the task is impacted by the change, recommend, via the network, one or more actions associated with the task.

2. The computing platform of claim 1, wherein the instructions comprise additional computer-readable instructions that, when executed by the at least one processor, cause the computing platform to:
monitor, based on the change to the legal framework, a potential change to another legal framework applicable to an enterprise organization; and
generate another alert notification indicating the potential change.

3. The computing platform of claim 1, wherein the instructions comprise additional computer-readable instructions that, when executed by the at least one processor, cause the computing platform to:
train a machine learning model to determine whether the task is impacted by the change.

4. The computing platform of claim 3, wherein the instructions comprise additional computer-readable instructions that, when executed by the at least one processor, cause the computing platform to:
apply the machine learning model to determine whether the task is impacted by the change.

5. The computing platform of claim 1, wherein the instructions comprise additional computer-readable instructions that, when executed by the at least one processor, cause the computing platform to:
train a machine learning model to recommend the one or more actions associated with the task.

6. The computing platform of claim 5, wherein the instructions comprise additional computer-readable instructions that, when executed by the at least one processor, cause the computing platform to:
apply the machine learning model to recommend the one or more actions associated with the task.

7. The computing platform of claim 1, wherein the task comprises a review of a contract, and wherein the instructions to identify the at least one task parameter comprise additional computer-readable instructions that, when executed by the at least one processor, cause the computing platform to:
conduct an image analysis of the contract;
determine, based on the image analysis, at least one term of the contract that may be impacted by the change, and
wherein the instructions to recommend the one or more actions comprise additional computer-readable instructions that, when executed by the at least one processor, cause the computing platform to:
recommend the at least one term of the contract for review.

8. The computing platform of claim 7, wherein the instructions to recommend the at least one term of the contract for review comprise additional computer-readable instructions that, when executed by the at least one processor, cause the computing platform to:
modify the at least one term of the contract to comply with the change to the legal framework.

9. The computing platform of claim 1, wherein the task comprises a review of an enterprise policy, and wherein the instructions comprise additional computer-readable instructions that, when executed by the at least one processor, cause the computing platform to:
determine at least one aspect of the enterprise policy that may be impacted by the change, and
wherein the instructions to recommend the one or more actions comprise additional computer-readable instructions that, when executed by the at least one processor, cause the computing platform to:
recommend the at least one aspect of the enterprise policy for review.

10. The computing platform of claim 1, wherein the received data includes
media content associated with the legal framework retrieved from a website associated with a news medium.

11. The computing platform of claim 1, wherein the instructions to configure the web search engine further include additional computer-readable instructions that, when executed by the at least one processor, cause the computing platform to:
retrieve, from a website associated with a regulatory entity, a text of the legal framework, and
wherein the instructions to detect the change further comprise additional computer-readable instructions that, when executed by the at least one processor, cause the computing platform to:
analyze, via optical character recognition, the text, to detect the change.

12. The computing platform of claim 1, wherein the task comprises a review of one or more of: a vendor policy, a process, a database policy, an encryption policy, and a data transmission policy.

13. A method, comprising:
at a computing platform comprising at least one processor, and memory:
configuring a web search engine to execute an automated script including a web search crawler to search and index websites on an internet;
based on the indexing, identify one or more websites from which to retrieve data;
receiving data from the identified one or more websites, the received data including video content;
convert the video content in the received data to a textual format;
analyzing, using natural language processing, the converted content to detect an indication of a change to a legal framework applicable to an enterprise organization;
detecting, via the computing platform, a task that may be impacted by the change;
upon detecting the task, identifying, via the computing platform, at least one task parameter associated with the task;
comparing, via the computing platform, the at least one task parameter with the change to determine whether the task is impacted by the change;
upon a determination that the task is impacted by the change, identifying, via the computing platform and for the task, a script associated with the at least one task parameter; and
recommending, via a network, one or more actions associated with the script.

14. The method of claim 13, further comprising:
apply a machine learning model to recommend the one or more actions associated with the script.

15. The method of claim 13, further comprising:
retrieving, from a website associated with a regulatory entity, a text of the legal framework, and
analyzing, via the computing platform and based on optical character recognition, the text, to detect the change.

16. The method of claim 13, wherein the task comprises a review of one or more of: a contract, an enterprise policy, a vendor policy, a process, a database policy, an encryption policy, and a data transmission policy.

17. One or more non-transitory computer-readable media storing instructions that, when executed by a computing platform comprising at least one processor, and memory, cause the computing platform to:
configure a web search engine to execute an automated script including a web search crawler to search and index websites on an internet;
based on the indexing, identify one or more websites from which to retrieve data;
receive data from the identified one or more websites, the received data including video content;
convert the video content in the received data to a textual format;
analyze, using natural language processing, the converted video content to detect an indication of a potential change to a legal framework applicable to an enterprise organization;
detecting, via a network, a task that may be impacted by the potential change;
upon detecting the task, identifying, via the network, at least one task parameter associated with the task;
comparing the at least one task parameter with the potential change to determine whether the task is impacted by the potential change; and
upon a determination that the task is impacted by the potential change, recommending, via the network, one or more actions associated with the task.

\* \* \* \* \*